Aug. 6, 1929.  G. STEINGRUBER  1,723,819
BRAKE TESTING DEVICE
Filed Feb. 6, 1929
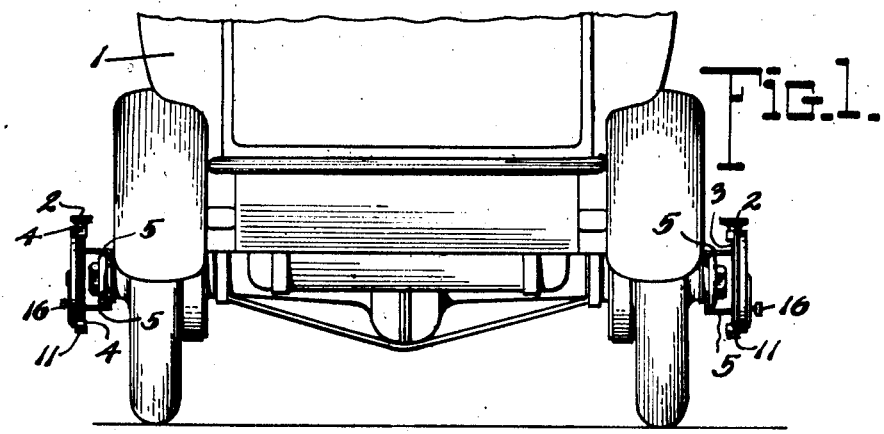
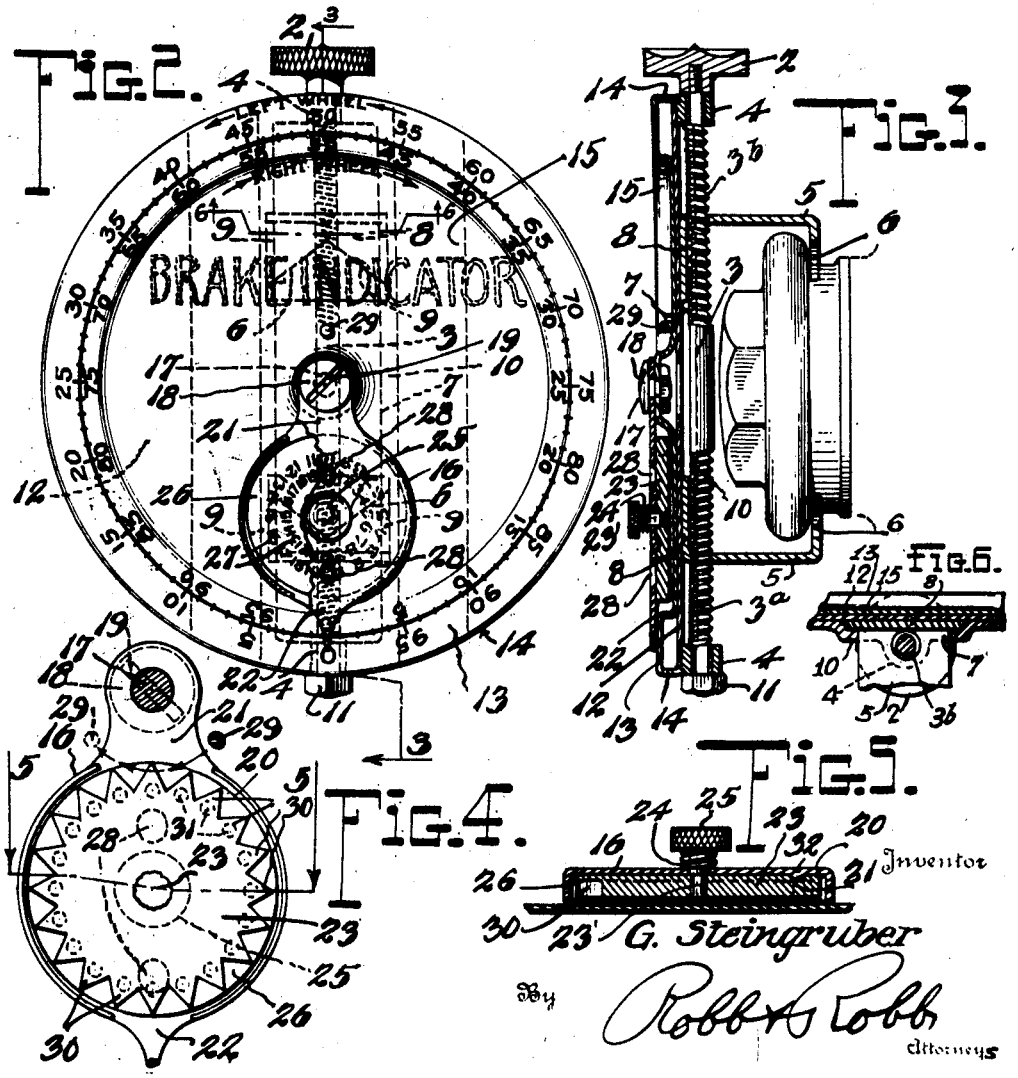

Patented Aug. 6, 1929.

1,723,819

UNITED STATES PATENT OFFICE.

GEORGE STEINGRUBER, OF ATLANTA, GEORGIA.

BRAKE-TESTING DEVICE.

Application filed February 6, 1929. Serial No. 337,877.

This invention relates to registering devices and more particularly to those devices which are primarily adapted for use in testing brakes of vehicles.

The method of testing brakes most universally used at present is to jack up the driving wheels of the vehicle and cause them to be rotated by engaging the transmission gears in the usual manner done under ordinary driving conditions. After the wheels have reached a reasonable speed, corresponding to twenty or thirty miles an hour, the clutch is disengaged and the brakes applied by the operator, while the action of the wheels is observed to see which one stops first under the braking influence. By adjusting the tension of the brakes between numerous starting and stopping operations, the brakes are equalized so that both wheels will stop simultaneously when the brakes are applied. Such a method of testing requires at least two persons to perform the test, one to operate the starting and stopping of the wheels and another to observe the action of the wheels as the brakes are applied. Comparison of equalizing adjustments can only be made on the driving wheels in a test performed in this manner, whereas, in the case of four-wheel brakes, it is very important that the front wheel brakes be equalized as well, which cannot be done in this test. In jacking up the vehicle to perform the brake test, false operating conditions are established due to the fact that the momentum of the vehicle which is present under actual operating conditions is entirely left out of consideration.

Some of the disadvantages of the above mentioned test may be obviated by making the test under actual running conditions on the road, namely, by applying the brakes on the vehicle, while a second person standing near the path of travel of the vehicle observes the wheels to see which wheel skids or locks first. In this test, as well as in the first mentioned one, it is necessary to rely wholly upon the alertness and accuracy of the person watching the wheels, thus creating a great possiblity for error due to the human factor.

There are other methods of testing brakes which have not been so generally accepted as the aforementioned test, due to the fact they are quite complicated, or require bulky and expensive apparatus. Garage men and general mechanics usually prefer to make tests on the road rather than on a stationary brake testing machine, due to the fact that a test performed on such a machine results in brake adjustments which are inaccurate when the vehicle is tried out on the road after the adjustments have been made.

It has been my aim to provide a device which will overcome the aforementioned difficulties and disadvantages by enabling an accurate test to be performed under actual operating conditions.

A further object has been to provide a device which is very simple in construction and operation, being gearless and compact, and inexpensive to manufacture.

It has been my further aim to provide a testing device which may be quickly and easily attached to and detached from the wheels of an automobile, and which affords a test on all of the brakes and not merely the driving wheel brakes. My device also enables the test to be performed by one person, thereby eliminating, as far as possible, the human element.

Other and further objects and advantages of the invention will become apparent as the description of the device and the operation proceeds, the novel features being defined by the appended claims.

In the drawing:

Fig. 1 is a fragmentary rear elevation of an automobile having one of my testing devices applied to each wheel;

Fig. 2 is a front elevation of my invention, parts being broken away and shown in section;

Fig. 3 is a cross sectional view taken on line 3—3 of Fig. 2;

Fig. 4 is an enlarged detail view of the counter mechanism;

Fig. 5 is a cross sectional view taken on line 5—5 of Fig. 4; and

Fig. 6 is a sectional view on line 6—6 of Fig. 2.

Like reference characters refer to similar parts in the several figures of the drawing, in which 1 denotes a vehicle, such as an automobile, having brakes which are to be tested. One of my testing devices is applied preferably to the hub cap on each of the four wheels on a four-wheel brake type of automobile, or only on the rear wheels, or driving wheels, if the vehicle is of the two-wheel brake type.

To enable the device to be quickly attached to and detached from the hub cap, a suitable clamping device is provided, having a thumb nut 2 fixed to a shaft 3 provided with right-hand threads, as at 3ª, and lefthand threads at the other end, as at 3ᵇ. This shaft is journaled in bearings 4 suitably formed on the rear of the testing device. Engaging the threads are opposed clamping lugs or fingers 5, the hub cap engaging ends thereof being bifurcated at 6 to allow the fingers to firmly grip hub caps of various diameters. The fingers are retained in a track or guideway 7 by means of extensions 8 formed on the fingers, said extensions having lugs 9 on each side which slide beneath the overhanging flanges 10 formed on each side of the guideway. The shaft 3 is retained in the bearings in any suitable manner, a nut 11 being shown for that purpose in the drawing, the end of the shaft being swedged over the nut to prevent it from loosening or backing off. Rotation of the thumb nut 2 in one direction will cause the clamping fingers 5 to move towards each other, while rotation in the opposite direction will cause the fingers to move away from each other, thereby automatically centering the testing device when clamped on a hub cap.

The guideway 7 is preferably secured to a circular plate or disc 12 by spot welding, or in any other suitable manner, said disc being fixed to the body or indicia carrying disc or dial 13 preferably by forming a peripheral flange 14 at the outer edge of the dial and interlocking the flange at intervals with the plate 12.

The dial 13 is recessed at 15 to accommodate the counter mechanism 16, said counter mechanism being loosely carried by an adjustable shaft 17 fixed to the center of the dial. This shaft is shown in the form of a screw having an enlarged head 18 provided with a screw driver engaging slot 19, but it is obvious that any other suitable construction might be employed. A casing 20, formed with an extension 21 for loosely suspending the counter mechanism from the shaft 17, and having a pointer 22 formed diametrically opposite the extension 21, carries a star wheel 23, said star wheel being journaled in the casing and having a shaft 23' projecting therethrough. Encircling the star wheel shaft 23' and bearing against the outer face of the casing 20, is a helical spring 24 which is retained thereon by the resetting knob or nut 25, said spring causing the star wheel to be resiliently forced toward the inner face of the casing, a counter disc 26 being fixed to the star wheel on the side nearest the inner face of the casing so as to enable indicia 27 on the surface of said disc to be viewed through apertures 28 in the casing 20. Fixed to the recessed portion of the dial 13 is a pin or stud 29 which is adapted to strike teeth or points 30 on the star wheel as the dial is rotated to cause the indicia on the counter disc 26 to be successively shifted into register with the apertures at each revolution of the dial 13, the counter mechanism acting as a counter weight and always being held by gravity in a downward position by virtue of its loose fitting on the central shaft 17. The indicia on the counter disc preferably comprises numbers arranged thereon in two circles, one circle of numbers within the other, the set of numbers of one circle starting at zero and consecutively increasing in a clockwise direction while the numbers of the other set start at zero and consecutively increase in a counter-clockwise direction, the zero starting point of each set being arranged on the disc to read the proper number of revolutions, depending upon the direction of rotation of the disc and the relative positions of the apertures 28 in the casing. Hence, with the apertures formed diametrically opposite each other, as shown in the drawing, the zero starting point of each set of numbers should be displaced one hundred and eighty degrees in their respective circles. The numbers should be sufficiently spaced apart so as to cause the next consecutive number to advance into register with its respective aperture each time the pin 29 strikes a tooth of the star wheel as the disc 13 revolves to cause shifting of the counter disc. The star wheel and counter disc may be designed to read as many as twenty or thirty revolutions, twenty being sufficient for all practical purposes, this number allowing the brake test to be performed within a distance of approximately one hundred and fifty feet, which should be a sufficient distance to enable the automobile to be brought up to a speed of ten to twenty miles per hour and the brakes applied.

The counter disc 26 may be formed with small indentations 31 which cooperate with a small projection 32 on the casing whereby the dial will click into position so that it will be held more firmly at each shifting, the numbers always being centered in the apertures 28 to facilitate their being read. However, I do not wish to be limited to this particular construction as the dial may be formed with projections and the casing with an indentation, or any other suitable means whereby the numbers will be caused to center in the apertures might be employed.

The dial 13 is preferably graduated into one hundred divisions, being numbered from the same zero starting point both in a clockwise and counter-clockwise direction, so as to properly indicate a hundredth part of a revolution depending on the direction of rotation of the dial. Therefore, the counter mechanism disc indicates the number of complete revolutions while the pointer 22 cooperating with the graduations on the dial 13 indicates the fraction of a revolution. Arrows are preferably marked on both the dial 13 and the counter mechanism casing to indicate which set of figures to read for each direction of rotation of the dial, as it is obvious that the dial will be rotated in one direction when clamped to a wheel on the righthand side of the automobile, while it will be rotated in the opposite direction when clamped to a wheel on the opposite side of the automobile.

The device may be made of any suitable material and the indicia may be formed thereon in any suitable manner. However, I preferably make the device of brass to provide a more or less permanent construction which is rust proof as well as easily machined, and etch the figures and letters thereon to prevent them from being easily worn off.

In using my testing device, one is clamped on the hub cap of each wheel that has a brake; in other words, four devices are used on a four-wheel brake automobile and two on a two-wheel brake automobile. They are so positioned that each pointer of the counter mechanisms under the action of gravity points to zero on the dials 13, in which position the thumb nuts 2 are operated to firmly clamp the devices to the hub caps. The counter dials are rotated by turning the re-setting knob 25 so that the zero figures register in each aperture 28, the test then being ready to be performed.

The automobile is then started in the usual manner and after traveling a reasonable distance (approximately thirty or forty feet) to enable a speed of ten or fifteen miles per hour to be attained, the brakes are applied slowly in the usual manner and the automobile brought to a stop. The devices on each wheel are then observed and the complete revolutions shown by the counter discs and the fractional revolutions shown by the pointer and the dial, are made known to the operator, telling him the exact number of revolutions made by each wheel to the hundredth part of a revolution. By comparing the readings of the testing devices on each wheel, the operator learns which wheel stopped first and dragged, this being the one that has made the fewest number of revolutions as indicated by the testing devices. Adjustments are then made, either by loosening that brake slightly or by tightening the others, and the devices on each wheel are reset so that the pointers point to zero on the dials and the counter discs indicate zero through the apertures, whereupon a new trial similar to the previous one is made. Usually the final equalization of the brakes, so that each stops its wheel simultaneously with the others, may be attained in two or three trials at the most, the complete test being very simple and quickly performed entirely by one person.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. A brake testing device of the class described comprising a dial having indicia thereon, said dial being adapted to be applied to a vehicle wheel, a pendent indicator loosely supported from the center of said dial for cooperating with said indicia, a counting mechanism carried by said pendent indicator, and means carried by said dial for operating said counting mechanism incident to rotation of the dial.

2. A brake testing device of the class described comprising a dial having indicia thereon, a pendent indicator forming a casing and having a pointer for cooperating with said indicia, a counting mechanism located in said casing, means on the dial for operating said counting mechanism, and means carried by the dial for clamping the device to a vehicle wheel to effect rotation of the dial with the wheel and operation of the counting mechanism.

3. A brake testing device of the class described comprising a dial having indicia thereon, a pendent indicator forming a casing and having a pointer for cooperating with said indicia, a counting mechanism located in said casing, said counting mechanism including a star wheel rotatably carried by the casing and having indicia thereon, means carried by the dial for causing shifting of said star wheel incident to rotation of the dial, and means for securing the device to a vehicle wheel.

4. A brake testing device of the class described comprising a dial having indicia thereon, a pendent indicator forming a casing and having a pointer for cooperating with said indicia to indicate partial revolutions, a counting mechanism located in said casing, said counting mechanism including a star wheel rotatably carried by the casing and having indicia thereon, means carried by the dial for causing shifting of said star wheel incident to rotation of the dial, means cooperating with the last mentioned indicia for indicating complete revolutions, and means for clamping the device to a vehicle wheel.

5. A brake testing device of the class described comprising a dial having indicia thereon, a pendent indicator forming a casing and having a pointer for cooperating with said indicia to indicate partial revolutions, a counting mechanism located in said casing, said counting mechanism including a toothed star wheel rotatably carried by the casing and having indicia thereon, means carried by the dial for causing shifting of said star wheel incident to rotation of the dial, said means comprising a pin adapted to engage the teeth of said star wheel, said casing having an aperture, means cooperating with the last mentioned indicia for indicating complete revolutions, and means for securing the device to a vehicle wheel hub cap.

6. A brake testing device for vehicle wheels comprising a dial having indicia thereon, a pendent indicator forming a casing and having a pointer for cooperating with said indicia, a counting mechanism located in said casing, said counting mechanism comprising a star wheel having indicia thereon, said indicia on both the dial and star wheel being arranged to give direct readings irrespective of the direction of rotation of the vehicle wheel, means carried by the dial for causing shifting of said star wheel incident to rotation of the dial, and means for clamping the device to a vehicle wheel.

7. An attachment for a vehicle comprising a body portion having indicia thereon, a gravity influenced member carried by said body portion, a counting disc carried by said member, a striker on said body portion for operating said disc, and means for securing said attachment to a rotative element on the vehicle.

In testimony whereof I affix my signature.

GEORGE STEINGRUBER.